(12) United States Patent
Tomita (10) Patent No.: US 6,880,029 B2
(45) Date of Patent: Apr. 12, 2005

(54) PROGRAMMABLE CONTROLLER

(75) Inventor: Kazuaki Tomita, Kyoto (JP)

(73) Assignee: Omron Corporation, Kyoto (JP)

( * ) Notice: Subject to any disclaimer, the term of this patent is extended or adjusted under 35 U.S.C. 154(b) by 337 days.

(21) Appl. No.: 09/805,567

(22) Filed: Mar. 14, 2001

(65) Prior Publication Data

US 2001/0023470 A1 Sep. 20, 2001

(30) Foreign Application Priority Data

Mar. 15, 2000 (JP) ........................................ 2000-073050

(51) Int. Cl.⁷ ............................................. G06F 13/24
(52) U.S. Cl. ...................................... 710/260; 710/266
(58) Field of Search ................................ 710/260, 266, 710/267, 262; 700/18, 7, 11, 23; 709/103, 107

(56) References Cited

U.S. PATENT DOCUMENTS

| | | | |
|---|---|---|---|
| 4,638,452 A | * | 1/1987 | Schultz et al. .............. 710/266 |
| 5,023,770 A | | 6/1991 | Siverling |
| 5,051,945 A | * | 9/1991 | Hayashi ...................... 710/262 |
| 5,193,189 A | * | 3/1993 | Flood et al. ................ 709/103 |
| 5,225,974 A | | 7/1993 | Mathews et al. |
| 5,553,297 A | * | 9/1996 | Yonezawa et al. ........... 700/18 |
| 5,765,000 A | | 6/1998 | Mitchell et al. |

FOREIGN PATENT DOCUMENTS

| | | |
|---|---|---|
| EP | 0 321 575 A1 | 6/1989 |
| EP | 0 766 156 A1 | 4/1997 |

* cited by examiner

*Primary Examiner*—Khanh Dang
(74) *Attorney, Agent, or Firm*—Foley & Lardner LLP (57) ABSTRACT

In a programmable controller which executes a user program process, an I/O refresh process and a peripheral service process by using a same microprocessor, the cyclic execution of the peripheral service process by a prescribed amount is ensured so as to enable a satisfactory data relay function without regard to the time period required for the execution of the user program process. The user program process which is being executed by the normal process means is interrupted by the peripheral service process which is executed by a prescribed amount according to an interruption procedure every time an interruption trigger is generated.

6 Claims, 12 Drawing Sheets

PROGRAMMABLE CONTROLLER

FIELD OF THE INVENTION

The present invention relates to a programmable controller serving also as a data relay unit in a FA (factory automation) network, and in particular to such a programmable controller which ensures the cyclic execution of a peripheral service process by a prescribed amount, for instance, to enable a satisfactory data relay function without regard to the time period required for the execution of a user program process.

BACKGROUND OF THE INVENTION

For a programmable controller serving also as a data relay unit in a FA network, it is necessary to ensure a satisfactory data relay function at all times by executing a peripheral service process while executing the normal jobs such as a user program process between an upper-level computer and other programmable controllers. If the data transfer is not executed in a smooth manner, the upper-level computer may fail to execute application processes in a proper manner.

The upper-level computer is programmed in such a manner that the process of executing an application can move ahead every time a certain amount of data is retrieved from the associated program controllers. Therefore, if the data fails to be retrieved in a timely fashion, the process of executing the application is prevented from progressing in a smooth manner, and this may seriously affect the overall data processing performance of the system.

Figure 12:
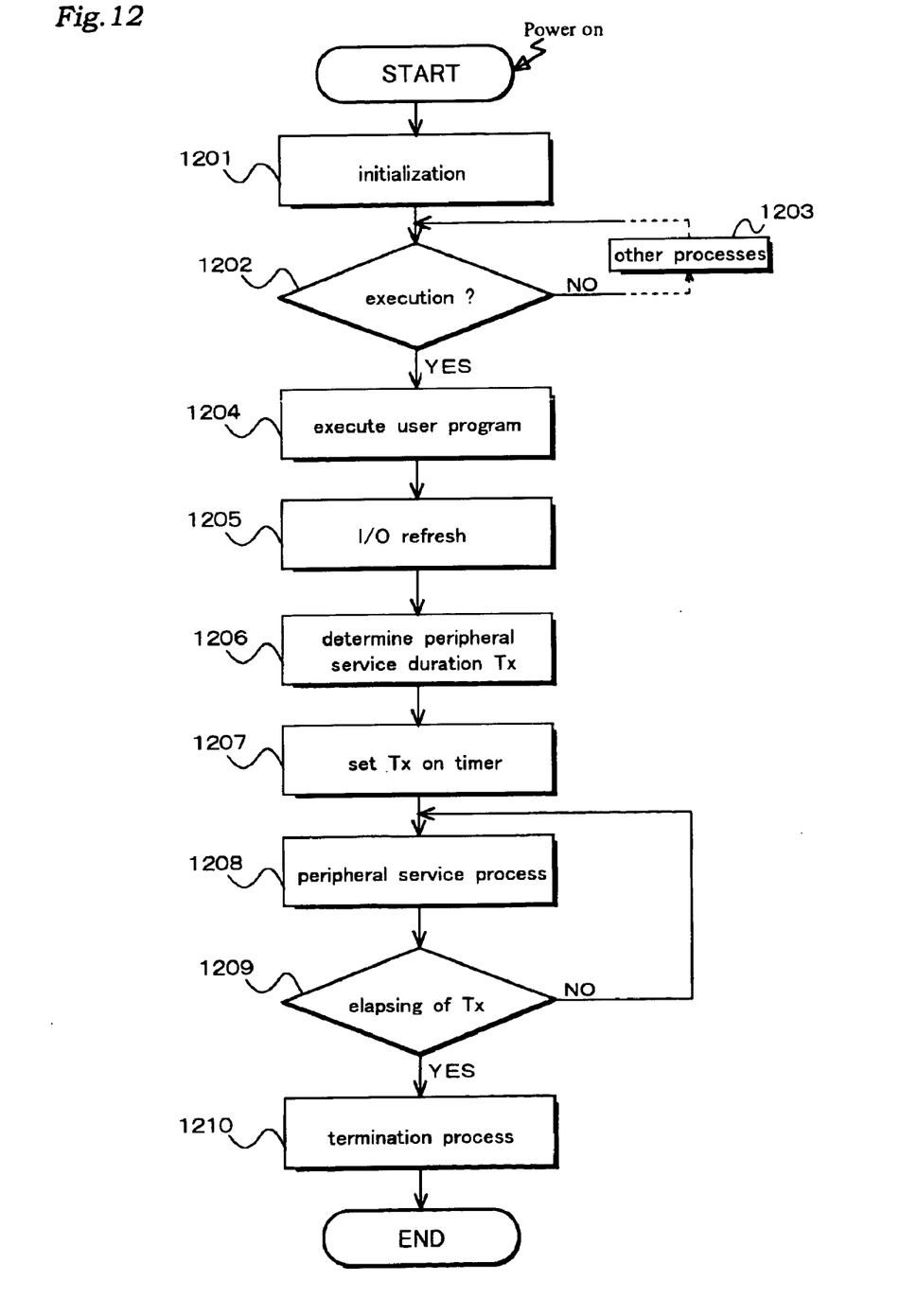
FIG. 12 is a flowchart showing the operation of the conventional PLC.

However, in the conventional programmable controller, the peripheral service process is executed only after the execution of the user program process and the I/O refresh process is completed as shown in the flowchart of FIG. 12.

Referring to FIG. 12, step 1201 is an initial process including updating of various flags. Step 1202 is a determination process for detecting the execution mode of the user program. Step 1203 represents other processes that are executed when the execution mode is not in progress. Step 1204 is a user program process. Step 1205 is an I/O refresh process. Step 1206 is a process for determining an execution duration Tx for a single execution of a peripheral service process. Step 1207 is a process for setting up on a timer the execution duration Tx for a single execution of the peripheral service process determined in step 1206. Step 1208 is a single execution of the peripheral service process. Step 1209 is a process for determining the progress of the execution duration Tx allocated to a single execution of the peripheral service process. Step 1210 is a post process following the completion of the single execution of the peripheral service process. The process for determining the progress of the execution duration Tx (step 1209) consists of a process for detecting a timer interruption.

As described above, because the peripheral service process in the conventional programmable controller is executed by a prescribed amount in a piecemeal manner following the completion of the user program process and the I/O refresh process, if the time period required for the execution of the user program princess has prolonged typically due to changes in the input and output information or revision of the program, the interval of executing the peripheral service process prolongs by a corresponding amount, and the data transfer process (including special I/O related processes) may fail to be executed in a satisfactory manner.

BRIEF SUMMARY OF THE INVENTION

In view of such problems of the prior art, a primary object of the present invention is to provide a programmable controller which ensures the cyclic execution of a peripheral service process by a prescribed amount, for instance, to enable a satisfactory data relay function without regard to the time period required for the execution of a user program process.

Another object of the present invention is to provide a programmable controller which allows the execution interval of a peripheral service process and/or a time period allocated for each single execution of the peripheral service process to be changed at will.

Yet another object of the present invention is to provide a programmable controller which can selectively execute an operation mode for sequentially executing the user program process, I/O refresh process and peripheral service process one after another, and another operation mode for executing the peripheral service process by cyclic interruption at an independently defined regular interval.

These and other objects and advantages of the present invention will become apparent for a person skilled in the art by referring to the following description in association with the appended drawings.

The programmable controller of the present invention is based on a programmable controller which executes a user program process, an I/O refresh process and a peripheral service process by using a same microprocessor.

Additionally, the programmable controller of the present invention comprises normal process means for cyclically executing the user program process and I/O refresh process according to a normal procedure; interruption trigger generating means for generating an interruption trigger at a prescribed interval; and interruption process means for interrupting the user program process by the normal process means and executing the peripheral service process by a prescribed amount according to an interruption procedure every time an interruption trigger is generated.

The "peripheral service process" as used herein means any processes other than those which are essential for the main functions of the programmable controller such as the user program process and I/O refresh process. More specifically, the peripheral service process may include such processes as data communication with an upper-level computer, communication with special I/O or remote I/O, and data relay process in a FA network.

The "prescribed amount" as used herein means that a series of steps of a peripheral service process are not executed in a single stroke but are executed in a number of sessions. How many sessions are required for the completion of the particular peripheral service process depends on the relationship with the time duration of the single execution of the particular peripheral service process. The greater the amount of the entire peripheral service process, the larger is the number of sessions that are required to complete the peripheral service process, as one can readily appreciate.

The "prescribed interval" as used herein may also mean the total time interval given as a sum of the time period of the previous execution of the peripheral service process and a prescribed time period.

According to this structure, without regard to the length of the time duration required for executing the user program process, the execution of the peripheral service process is ensured by a prescribed amount at a regular interval. In other words, because the same microprocessor executes the user program process, I/O refresh process and peripheral service process of a prescribed amount at a regular interval, even when the duration of the execution of the user program process prolongs for any reason, the execution interval of the peripheral service process would not be prolonged, and this ensures a smooth data transfer at all times.

According to a preferred embodiment of the present invention, the programmable controller is provided with changing means for changing the interval of generating an interruption trigger by the interruption trigger generating means and/or changing means for changing the time duration of executing the peripheral service process by the interruption process means.

The "changing means" as used herein may include a connecting tool such as a programming console for a programmable controller. Typically, in a programmable controller of this type, it is possible to set up data in the I/O memory and data memory and change the data by using a special programming console (which may also consist of application software of a personal computer).

According to this structure, the execution interval of the peripheral service and execution duration can be changed by using the changing means. Thus, the peripheral service process can be executed at an appropriate frequency which suits the situation in which the programmable controller is placed. Also, even if the execution duration of the peripheral service prolongs to such an extent as to otherwise delay the execution of other processes, such a delay can be avoided by changing the execution duration of the peripheral service process to an appropriate value.

When the prescribed interval is determined by the sum of the time duration of executing the previous peripheral service process and a prescribed time period, by changing the prescribed time period by using the "changing means", the interval of generating an interruption trigger can be changed indirectly.

The "changing means" for changing the interval of generating an interruption trigger by the interruption trigger generating means and/or for changing the time duration of executing the peripheral service process by the interruption process means may also be implemented by a special command language that can be used in the user program.

The "special command language that can be used in the user program as used herein" means that suitable commands can be newly defined. Such commands may be designed as those that can rewrite the execution interval data and execution duration data, or newly define them by executing the commands.

According to this structure, the user can change the frequency of the peripheral service process and execution duration by using appropriate commands in a relatively simple manner. Additionally, by incorporating execution conditions in these commands, it is possible to effect such changes depending on the execution situation (control situation) of the user program in an automatic manner.

The programmable controller of the present invention may also be constructed as comprising means for selecting a first mode and a second mode; the first mode being for cyclically executing the user program process and I/O refresh process according to a normal procedure, and the second mode being for executing the peripheral service process by a prescribed amount at a regular interval according to an interruption procedure while executing the user program process and I/O refresh process according to the normal procedure.

The "changing means" may also cover the case where the change is effected manually by operating a programming console or the like, and the case where it is accomplished by executing a user program using a special command language.

According to this structure, the first and second modes can be switched one from the other by using the changing means according to the operating state of the programmable controller. In other words, in the second mode, the peripheral service process can be executed at a prescribed amount as a cyclic interruption process, and the above mentioned advantages can be gained. In the first mode, the program controller can execute the peripheral service process for each execution cycle according to the normal procedure in a same way as a conventional programmable controller.

BRIEF DESCRIPTION OF THE DRAWINGS

Now the present invention is described in the following with reference to the appended drawings, in which.

DETAILED DESCRIPTION OF THE PREFERRED EMBODIMENTS

Several preferred embodiments of the programmable controller of the present invention are now described in the following with reference to the appended drawings.

Figure 1:
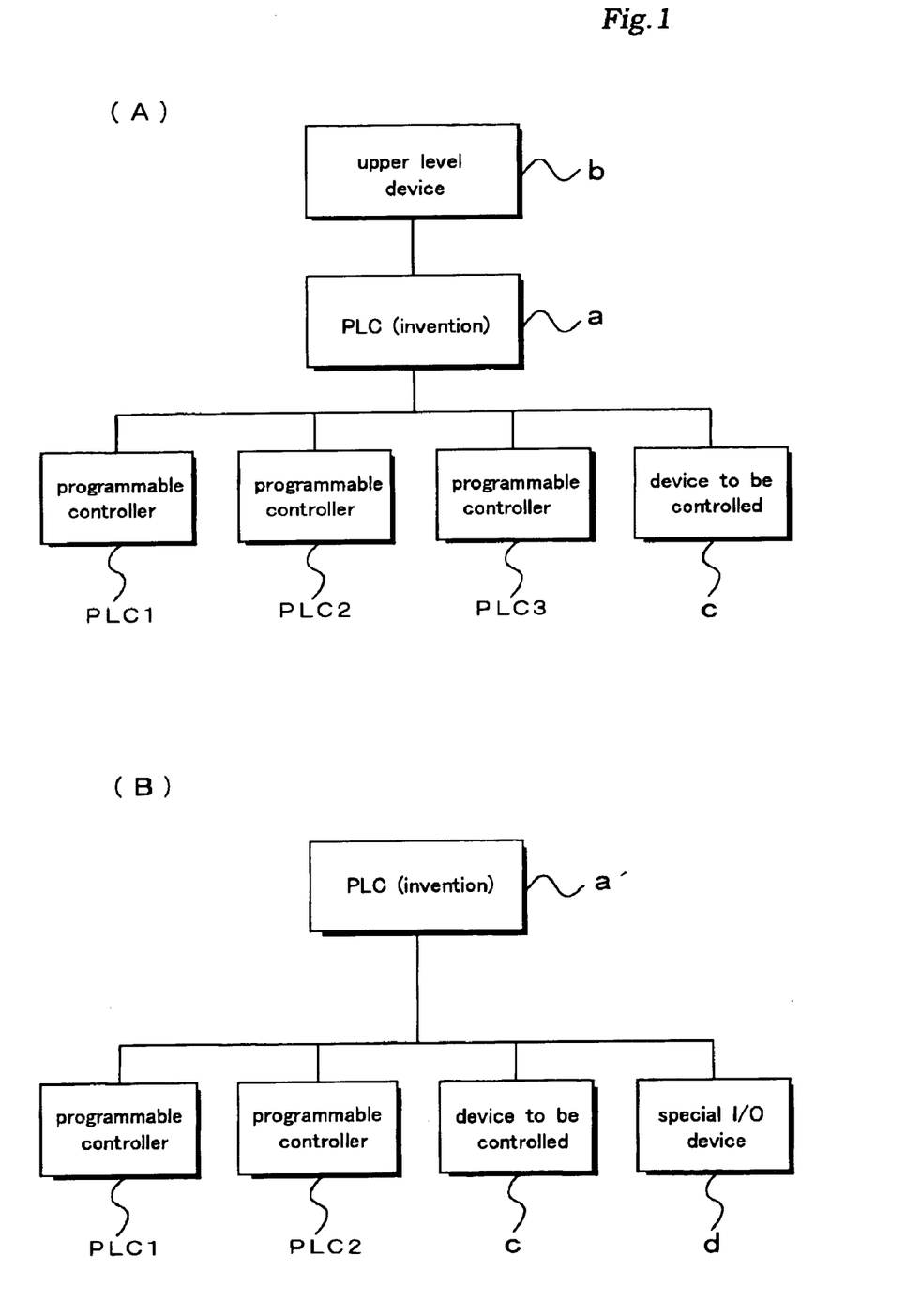
FIG. 1 is a schematic structural view showing an exemplary application of the PLC of the present invention.

FIG. 1 schematically illustrates a programmable controller embodying the present invention.

The programmable controller illustrated in FIG. 1(A) exemplifies an application in a FA network. In this example, the programmable controller (a) according to the present invention serves not only as a controller for a device (c) to be controlled but also as a data relay unit for transferring data from lower level programmable controllers PLC1, PLC2 and PLC3 to an upper level device (b).

The programmable controller illustrated in FIG. 1(B) exemplifies an application in which the programmable controller carries out PID control. In this example, the programmable controller (a') according to the present invention controls not only a device (c) to be controlled but also a special I/O device (d) according to data forwarded from lower level programmable controllers PLC1 and PLC2.

The programmable controller of the present invention is particularly suitable for use as such a data relay unit and PID control unit. However, such applications are only exemplary, and the programmable controller of the present invention is not limited to such applications.

Figure 2:
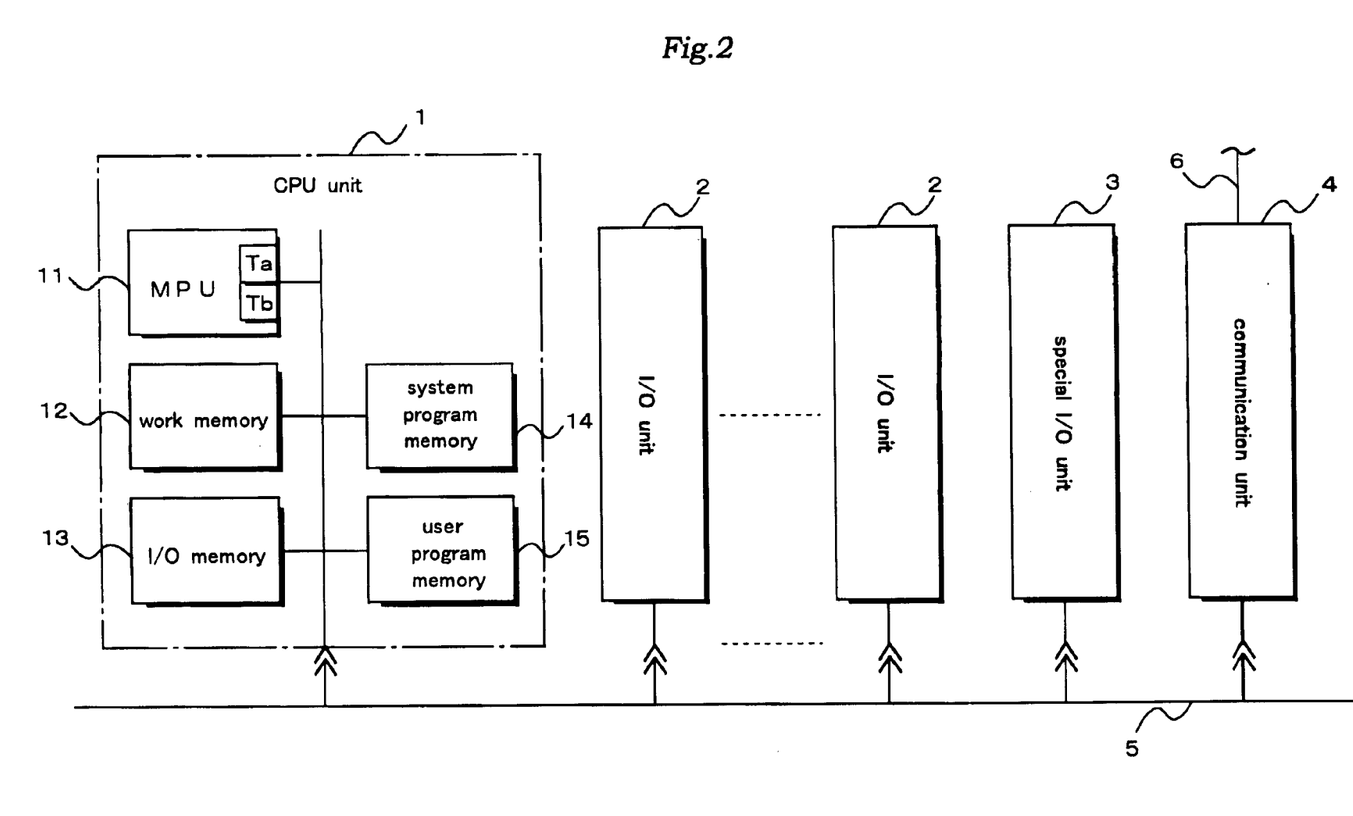
FIG. 2 is a block diagram showing the system structure of the PLC of the present invention.

The overall system structure of the programmable controller of the present invention is illustrated in the block diagram of FIG. 2. As shown in this drawing, the programmable controller comprises at least a CPU unit 1, a plurality of I/O units 2 for various pieces of equipment that are required to be controlled, a special I/O unit 3 for special equipment to be controlled according to PID control, and a communication unit 4 for communicating with other PLCs and an upper level computer. Numeral 5 denotes a data bus, and numeral 6 denotes a communication serial bus.

The CPU unit 1 comprises a microprocessor (MPU) 11, work memory 12, I/O memory 13, system memory 14, and user program memory 15.

The CPU unit 1 mainly consists of the microprocessor 11, and performs the functions of a PLC by executing various system programs that are stored in the system program memory 14.

The user program memory 15 stores user programs corresponding to the control requirements that are defined by the user. The work memory 12 serves as a temporary storage area for intermediate results of computation during the execution of the programs by the CPU 1. The I/O memory 13 serves as a storage area for the input data that is obtained from the I/O units 2, special I/O unit 3 and communication unit 4, and the output data that is to be forwarded to the I/O units 2, special I/O unit 3 and communication unit 4.

The microprocessor 11 is incorporated with a timer Ta for cyclic interruption for the peripheral service process, and a timer Tb for monitoring the execution duration of the peripheral service process.

Figure 3:
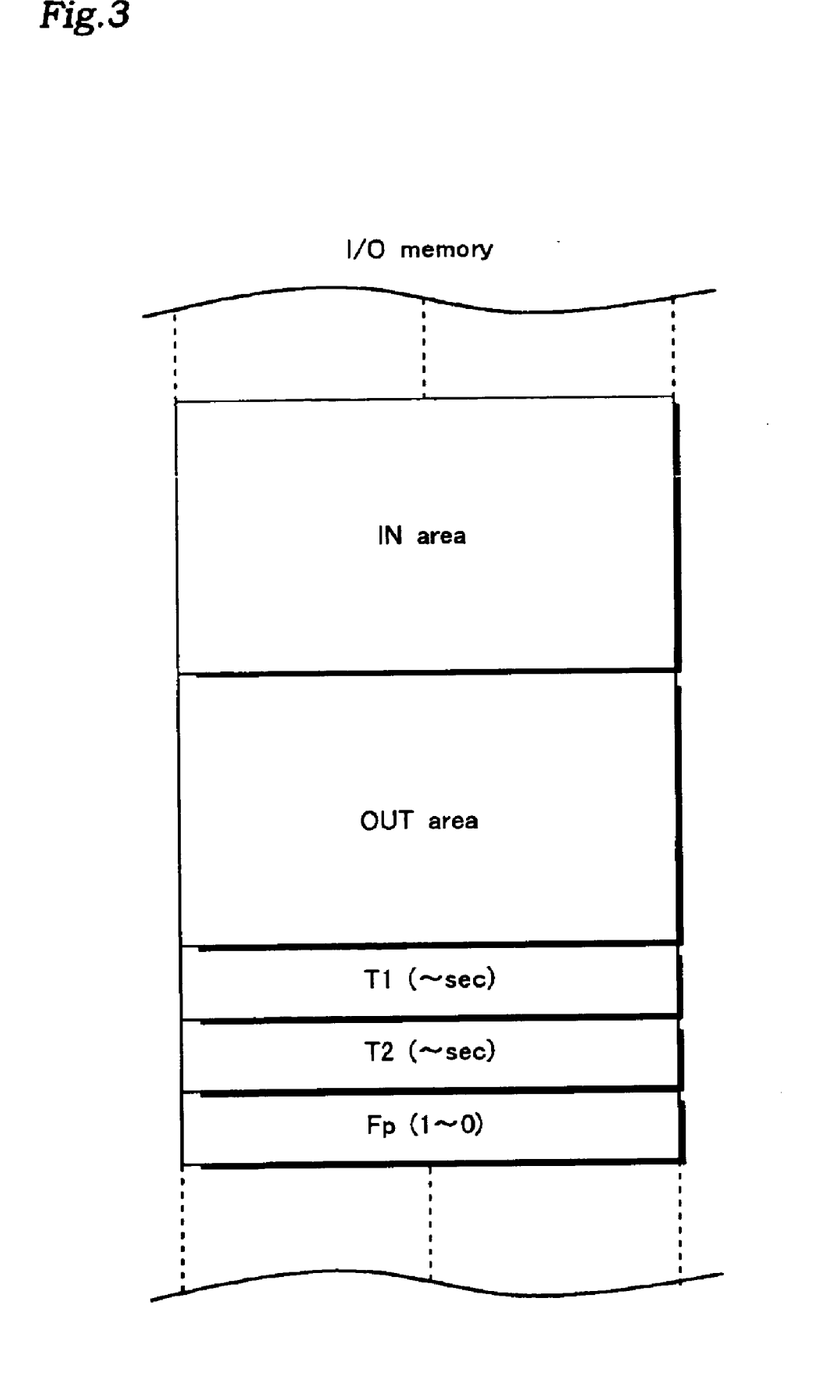
FIG. 3 is a view showing different areas of the I/O memory.

As illustrated in FIG. 3, the I/O memory 13 is provided with an area for time data T1 corresponding to the interruption execution interval for the peripheral service process, an area for time data T2 corresponding to the execution duration of the peripheral service process and an area for a peripheral service process priority flag Fp which is described hereinafter, in addition to the IN area and OUT area.

Figure 4:
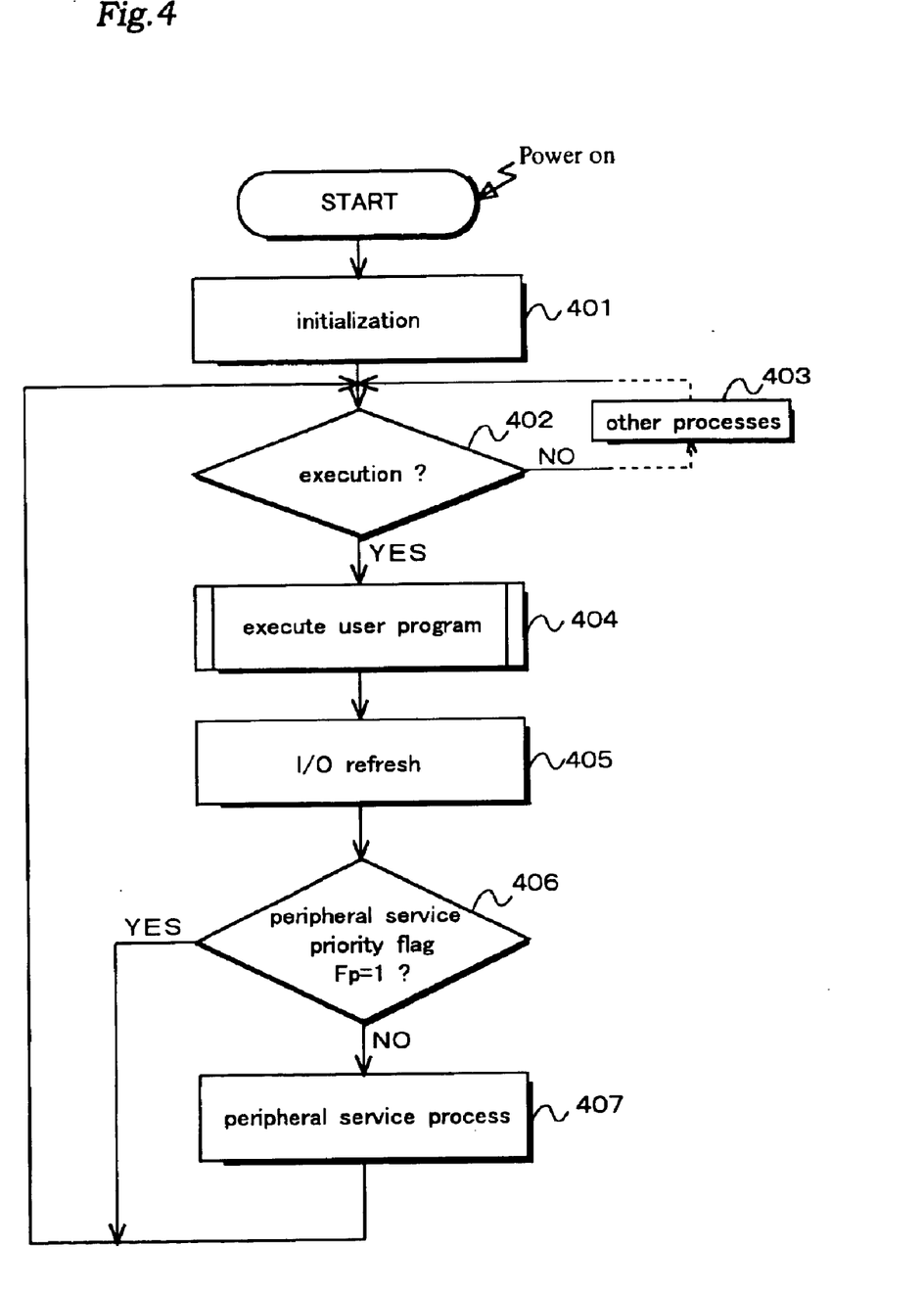
FIG. 4 is a flowchart showing the operation of the PLC of the present invention according to the normal procedure.

The flowchart illustrating the normal procedure of the programmable controller is shown in FIG. 4.

Referring to FIG. 4, when a power switch not shown in the drawing is turned on, various flags and registers required for the operation of the system are initialized (step 401). Then, according to a state flag not shown in the drawing which is controlled by a RUN operation, it is determined if the user program process is being executed or not. If the user program process is not being executed (step 402 NO), various other processes are executed until the execution of the user program process is started (step 403).

When the user program process is being executed (step 402 YES), the user program process (step 404) and the associated I/O refresh process (step 405) are executed in association with each other according to the normal procedure. Once these processes are completed, it is determined in the subsequent step 406 if the peripheral service priority flag Fp is "0" or "1" Depending on this determination result, it is determined if a first mode (peripheral service process priority mode OFF) or a second mode (peripheral service process priority mode ON) is being selected.

The peripheral service priority flag Fp is "1" when the peripheral service process priority mode is ON, and "0" when the peripheral service process priority mode is OFF. In other words, if Fp=1 is detected (step 406 YES), the peripheral service process is determined to be ON, and the second mode is selected which enables the interruption for the peripheral service process at a prescribed interval. As long as there is no interruption, the processes in steps 402 to 406 are cyclically repeated.

If Fp=0 is detected (step 406 NO), the peripheral service process is determined to be OFF, and the first mode is selected which enables the peripheral service process to be executed according to the normal procedure (step 407). Thereafter, until Fp=1 is detected in step 406, the process in steps 402 to 407 is cyclically repeated.

In other words, in the first mode, the user program process, I/O refresh process and peripheral service process are cyclically executed according to the normal procedure. On the other hand, in the second mode, the user program process and I/O refresh process are executed while the peripheral service process is executed according to the cyclic interruption procedure.

The user can select or define the ON/OFF of the peripheral service process priority mode, the interruption interval for the peripheral service process, and the execution duration of the peripheral service process at will via program commands.

Figure 5:
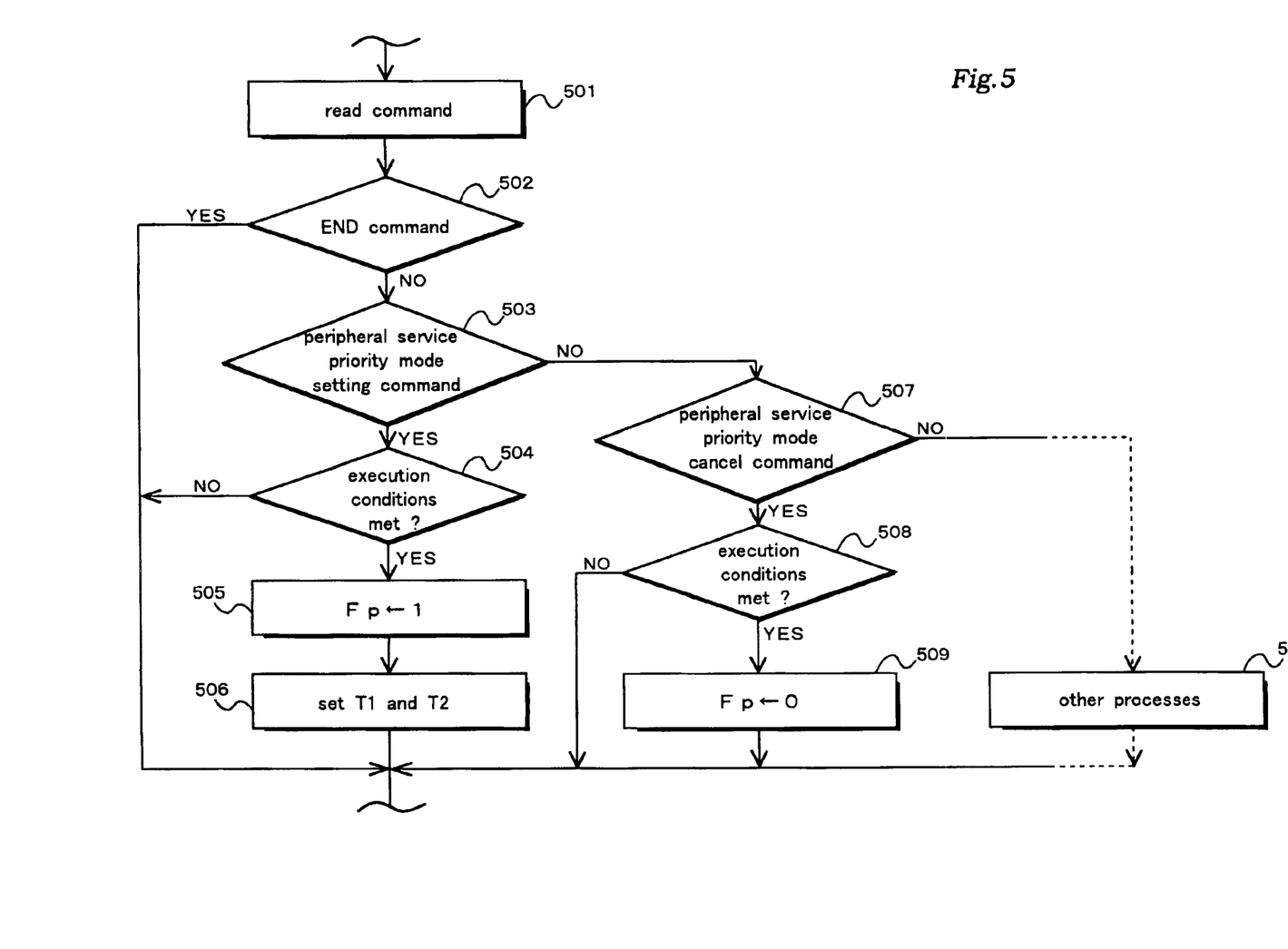
FIG. 5 is a flowchart showing the details of the setting of the peripheral service process priority mode.

The flowchart illustrating the details of the setting of the peripheral service process priority mode is shown in FIG. 5. The setting is made during the execution of a command (step 404 of FIG. 4) according to the normal procedure.

First of all, the command of the user program is read (step 501). If the command consists of an END command, the execution of the command is terminated (step 502 YES). If not (step 502 NO), the program flow advances to step 503.

If a priority mode setting command is determined in step 503, provided that the conditions for the setting process execution are all met (step 504 YES), "1" is stored in the peripheral service process priority flag Fp in the subsequent step 505. The time data T1 corresponding to the execution interval and the time data T2 corresponding to the execution duration are then read from the command operand, and stored in the prescribed areas of the I/O memory (step 506). Thus, the setting of the peripheral service process priority mode is completed. Even if the command read in step 501 consists of a priority mode setting command, as long as the conditions for the setting process execution are not met, the process is concluded without conducting the setting process (step 504 NO).

On the other hand, if the command does not consist of a priority mode setting command (step 503 NO), it is determined if it consists of a priority mode cancel command or not in step 507.

If the command consists of a priority mode cancel command (step 507 YES), provided that the conditions for the cancel process execution are all met (step 508 YES), "0" is stored in the peripheral service process priority flag Fp in the subsequent step 509. As a result, the peripheral service process priority mode is canceled. Even if the command read in step 501 consists of a peripheral service process priority mode cancel command, as long as the conditions for the setting process execution are not met, the process is concluded without canceling the priority mode (step 508 NO).

If the command consists of neither the priority mode setting command nor the priority mode cancel command (step 503 NO, and step 507 NO), other processes are conducted in step 510.

According to this structure of the programmable controller of the present invention, by the user writing the setting mode, the time data T1 and T2, and the associated revision conditions into the program via a prescribed command, it is possible to select the first mode (peripheral service process priority mode OFF) or the second mode (peripheral service process priority mode ON), and change the time data in an automatic fashion according to the state of the execution of the user program.

The programmable controller of this embodiment is adapted to select the first and second modes, and change the time data T1 and T2, but the rewriting of the flag Fp in the I/O memory and the changing of the time data T1 and T2 can be also accomplished by using a connecting tool such as a programming console.

When the setting of the peripheral service process priority mode is completed, and the flag Fp=1 is confirmed (step 406 YES in FIG. 4), the time data T1 corresponding to the aforementioned peripheral service process interruption interval is set up on the timer Ta in the microprocessor 11, and the timer Ta is activated at the same time.

Figure 6:
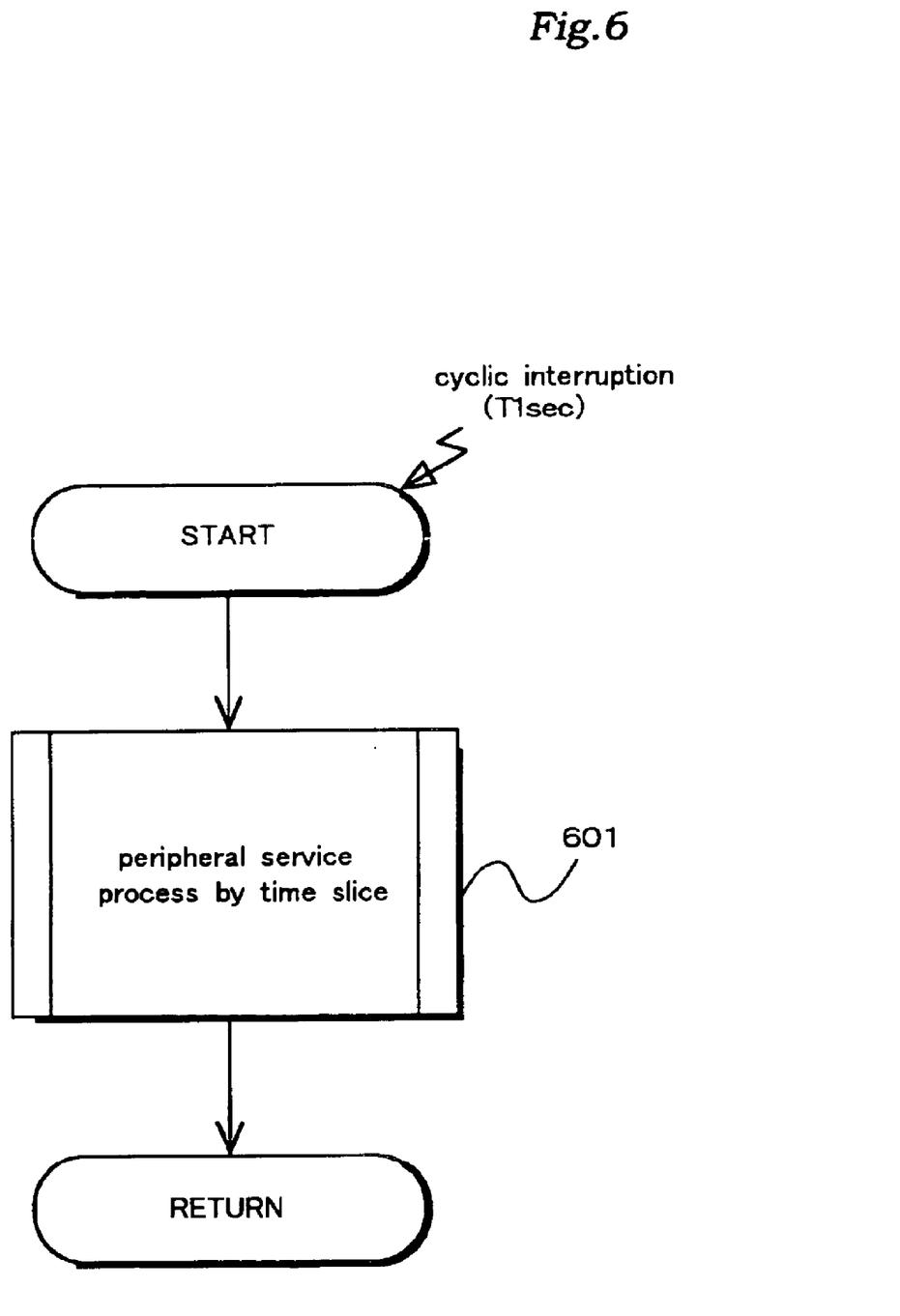
FIG. 6 is a general flowchart showing the peripheral service process based on cyclic interruption.

Thereafter, until the flag Fp=0 is confirmed, every time an interruption trigger is generated by the timing up of the timer Ta, the peripheral service process is repeatedly executed according to the time slice illustrated in FIG. 6 (step 601).

At this time, if the user program process is being executed according to the normal procedure, the address for the next command execution is saved in prescribed area of the memory. Upon completion of the peripheral service process, this address is retrieved, and, if applicable, after incrementing a program counter, the execution of the user program process is resumed.

Figure 7:
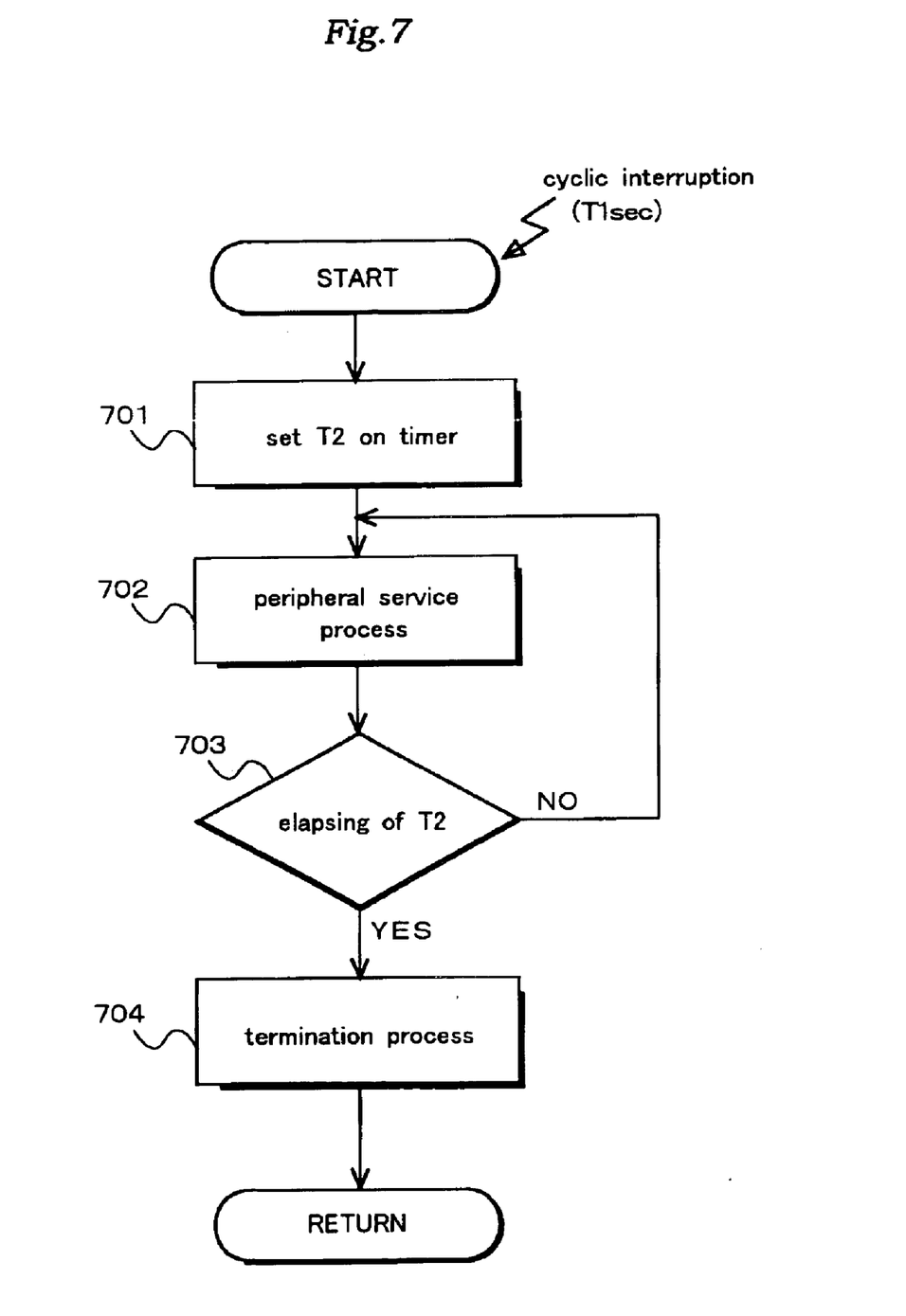
FIG. 7 is a detailed flowchart showing the peripheral service process based on cyclic interruption.

FIG. 7 is a flowchaff showing the details of the peripheral service process according to the cyclic interruption.

Once the peripheral service process according to the cyclic interruption is staffed, the time data T2 corresponding to the execution duration of the peripheral service process is retrieved from the prescribed area of the I/O memory, and is set up on the timer Tb in the microprocessor 11, and the timer Tb is activated at the same time (step 701). Thereafter, until the elapsing of time T2 is confirmed in step 703, the peripheral service process is continually executed (step 702, step 703 NO).

Upon timing up of the timer Tb, an interruption trigger is generated, and the peripheral service process is terminated (step 703 YES). Then, various termination processes (step 704) are executed.

In other words, the present invention allows the execution of the peripheral service process to be conducted as a time slice process according to the execution duration T2 defined by the user.

The programmable controller of the present invention is provided with means for prohibiting the cyclic interruption for the peripheral service process during the execution of the specific user program comprising a plurality of commands. The setting and canceling of the prohibition of the interruption are conducted in step 404 during the execution of the user program process.

Figure 8:
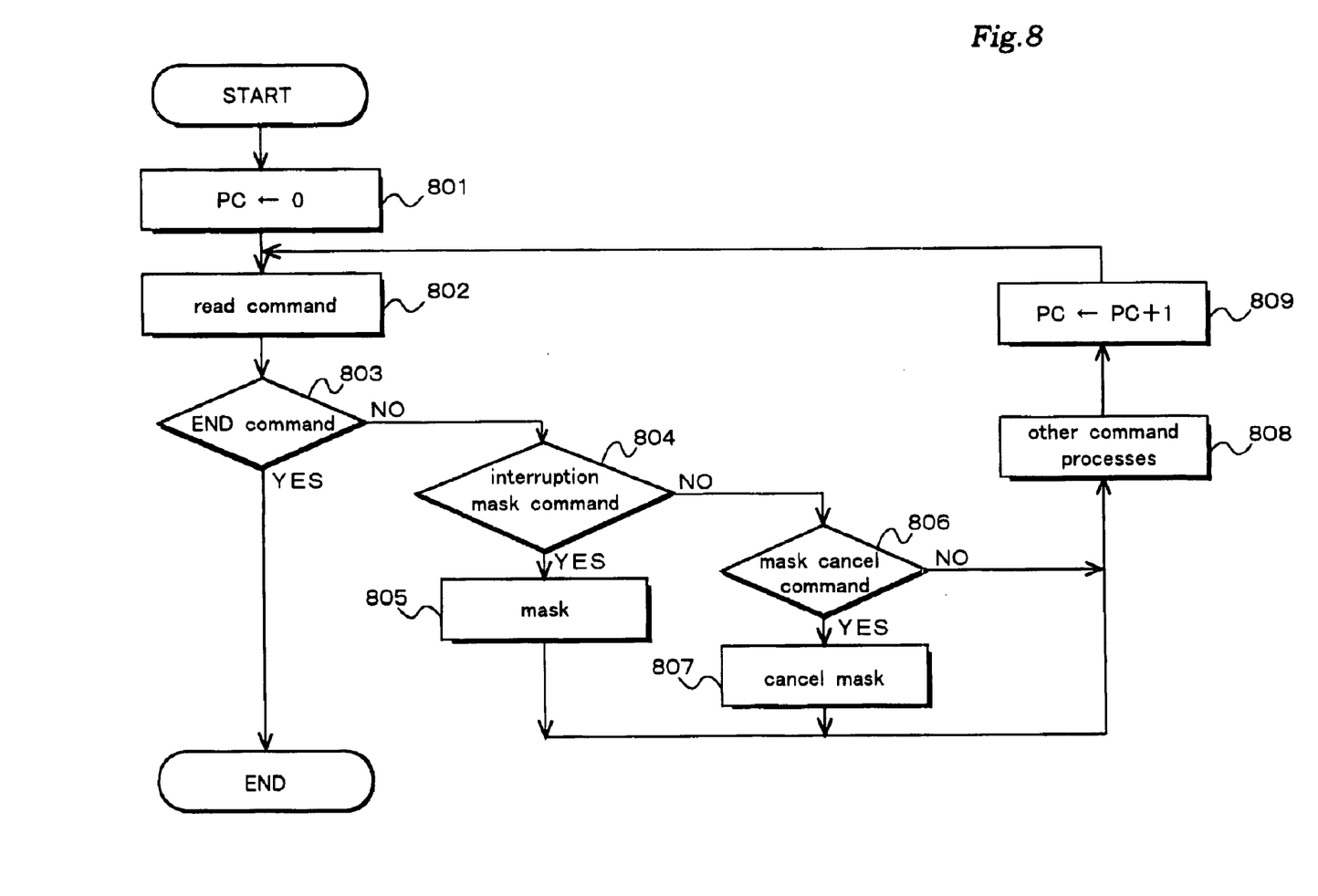
FIG. 8 is a flowchart showing the execution of the user program process and the interruption mask process.

FIG. 8 is a flowchart showing the details of the user program process.

When the execution of the user program process starts, the program counter is set to the top of the user program (step 801). Then, the user command is read (step 802). If the command consists of an END command, the execution of the user program process is terminated (step 803 YES). If not (step 803 NO), the program flow advances to the subsequent step 804. When an interruption mask command is detected in step 804 (step 804 YES), the mask process is executed (step 805), and the cyclic interruption for the peripheral service process is prohibited during the execution of the user program process until an interruption mask cancel command is read. Upon completion of the mask process, other command processes are executed in step 808.

On the other hand, if an interruption mask cancel command is read (step 806 YES) instead of an interruption mask command (step 804 NO), the mask canceling process is executed (step 807), and the cyclic interruption for the peripheral service process is enabled. Upon completion of the mask cancel process or the command does not consist of a mask cancel command (step 806 NO), other command processes are executed in step 808.

Once the other command processes are completed in step 808, the program counter is incremented (step 809), and a command is read once again (step 802). Thereafter, until an END command is detected in step 803, these processes are cyclically executed.

Figure 9:
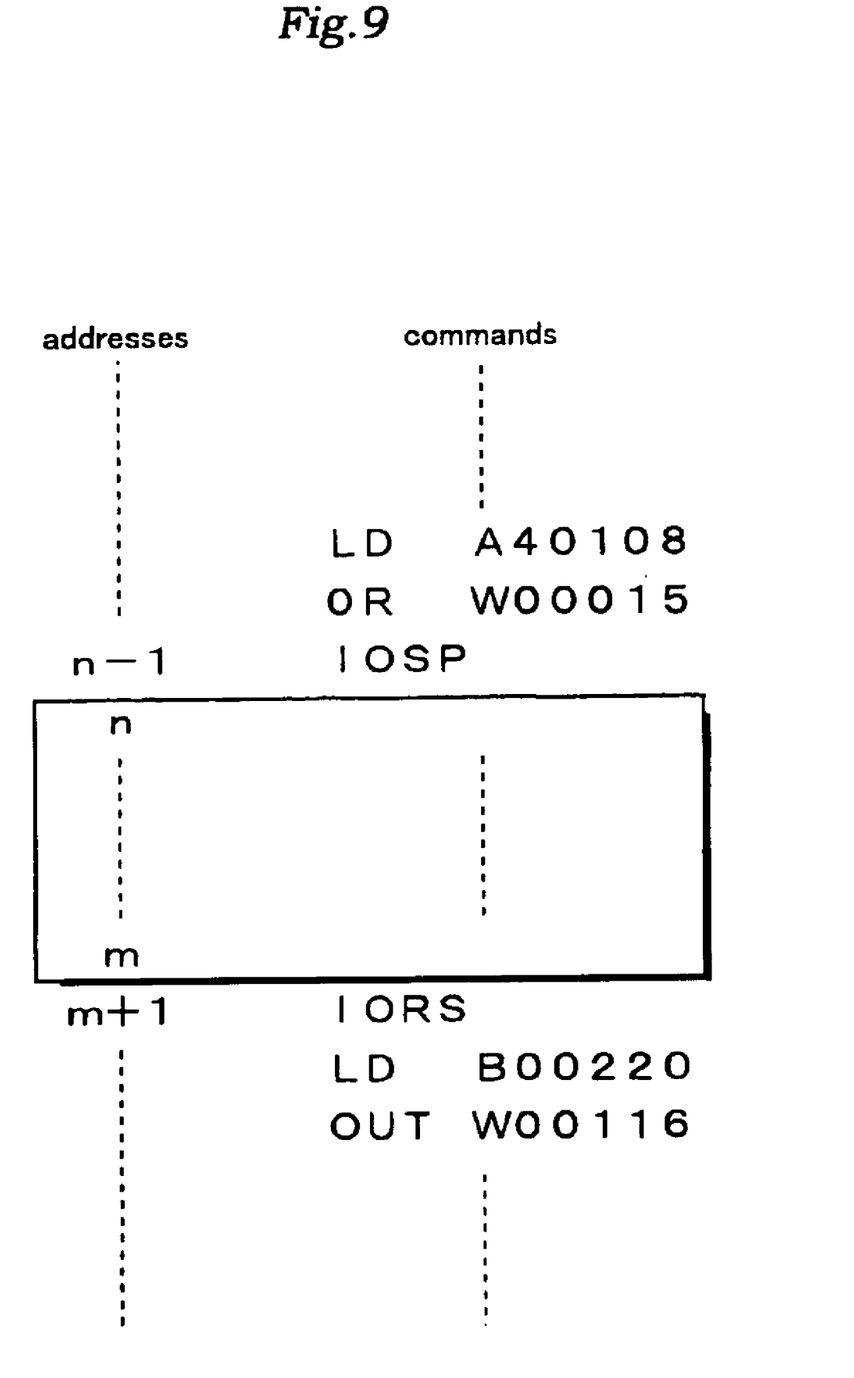
FIG. 9 is a diagram showing exemplary user commands for the PLC according to the present invention.

According to this structure, for instance, as shown in FIG. 9, an interruption mask command (IOSP) is inserted immediately ahead of the top command (address n) of a group of commands that are required to be executed jointly, and an interruption mask cancel command (IORS) is inserted immediately after the last address m+1 of the last command (address m).

Thereby, the interruption of the prescribed group of commands (addresses n to m) for the peripheral service process is prohibited so that an interruption trigger, even if when it is generated, is ignored, and the group of commands can be jointly executed without any interruption.

Figure 10:
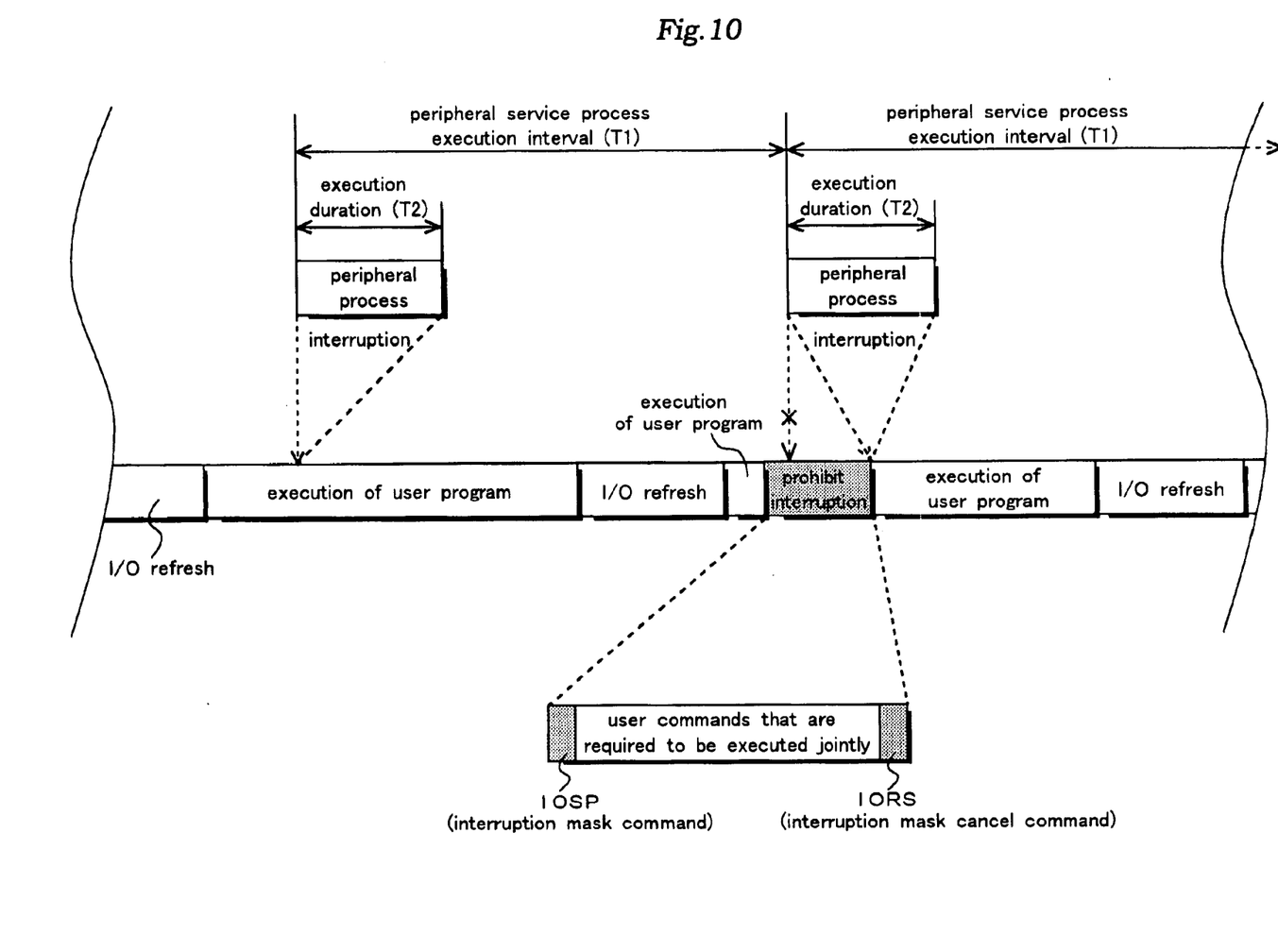
FIG. 10 is a time chart (part 1) of the operation of the PLC of the present invention.

The procedure of the interruption process for the peripheral service process in the programmable controller of the present embodiment is summarized in the time chart of FIG. 10. In this drawing, the interruption execution interval for the peripheral service process is defined by the time data T1, and the execution duration is defined by the time data T2. Once the cyclic interruption for the peripheral service process occurs, the execution of the user program process is temporarily suspended. However, when a group of commands placed between an interruption mask command (IOSP) and a mask cancel command (IORS) are being executed, the peripheral service process would not be initiated, and can be executed only after the completion of the mask cancel process.

Figure 11:
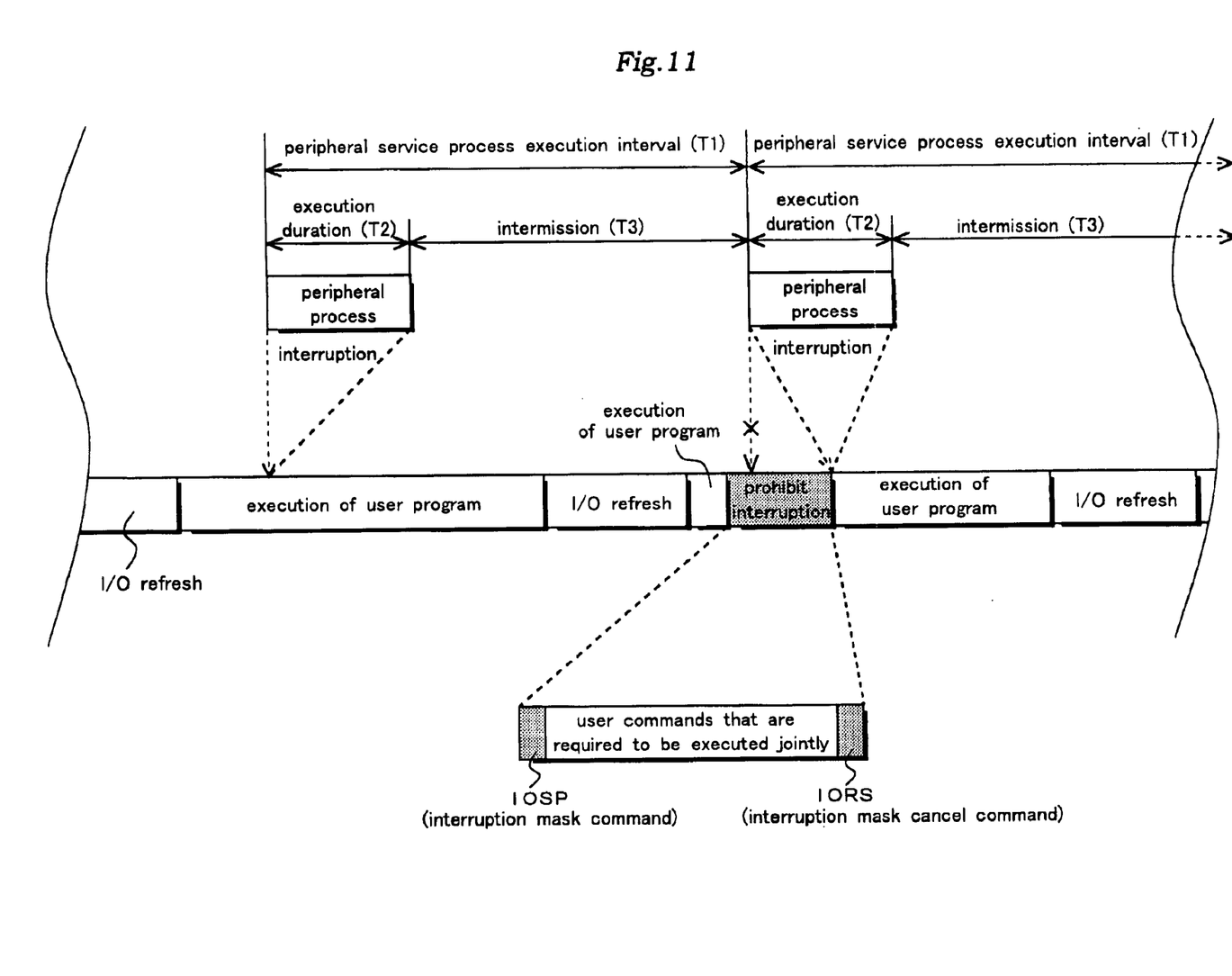
FIG. 11 is a time chart (part 2) of the operation of the PLC of the present invention.

The execution interval (T1) of the peripheral service process was calculated as the time period extending from the start of the current peripheral service to the start of the next peripheral service process. However, it may also be defined as the sum of the execution duration (T2) and a time period (intermission (T3)) extending from the end of the current peripheral service process to the start of the next peripheral service process as illustrated in FIG. 11. The program structure that would be required for achieving the means for changing the execution interval would be apparent for a person skilled in the art.

As can be appreciated from the foregoing description, according to the programmable controller of the present invention, the peripheral service process can be executed as a time slice process according to a cyclic interruption.

Thus, by applying the programmable controller of the present invention to the data relay unit a in a FA system and the PID control unit a' shown in FIG. 1, for instance, smooth data transfer and PID control are enabled. The embodiment described above was implemented as a building block type programmable controller, but the present invention is equally applicable to program controllers having a part or all of the I/O unit, special unit and communication unit incorporated in the CPU unit.

Additionally, because the execution interval and execution duration of the peripheral service process can be changed, and the priority mode flag Fp can be set according to the state of the execution of the user program process (step 504 or step 505), by the user setting up the execution state by using prescribed commands, these setting and changes can be accomplished in an automatic fashion.

As can be appreciated from the foregoing description, by applying the present invention to the programmable controller which additionally functions as a data relay unit in a FA network system, the execution of the peripheral service process can be ensured by a prescribed amount at a prescribed interval, and a smooth data transfer is ensured without regard to the length of the time required for executing the user program process.

Although the present invention has been described in terms of preferred embodiments thereof, it is obvious to a person skilled in the art that various alterations and modifications are possible without departing from the scope of the present invention which is set forth in the appended claims.

What is claimed is:

1. A programmable controller comprising:
   an I/O unit for input and output with various pieces of equipment that are to be controlled;
   an I/O memory for storing I/O data corresponding to the I/O unit;
   a user program memory for storing user program corresponding to user defined control requirements;
   a system program memory for storing various system programs in order to realize functions as a PLC (lower level programmable controller);
   a microprocessor for executing system program stored in the system program memory; and
   an interruption trigger generating means for generating an interruption trigger at a prescribed constant interval;
   said system program at least comprising;
      a user program execution process for executing user programs stored in the user program memory;
      an I/O refresh process for refreshing I/O data between the I/O memory and the I/O unit; and
      a peripheral service process comprising data communication with an upper-level computer, communication with special I/O or remote I/O, and data relay process in a factory automation (FA) network, wherein:
         the user program execution process and I/O refresh process are executed by a normal process of the microprocessor for a first prescribed constant amount of time, and the peripheral service process is executed for a second prescribed constant amount of time according to an interruption process of the microprocessor every time an interruption trigger is generated by the interruption trigger generating means, and wherein the first prescribed constant amount of time and the prescribed constant second period of time are unequal in duration.

2. A programmable controller according to claim 1, further comprising changing means for changing the prescribed constant interval of generating an interruption trigger by the interruption trigger generating means.

3. A programmable controller according to claim 1, further comprising changing means for changing the second prescribed constant amount of time of executing the peripheral service process executed by the interruption process means.

4. A programmable controller according to claim 1, further comprising means for prohibiting an external interruption during the execution of the user program process in response to reading a prescribed interruption mask command, and canceling the prohibition of the external interruption during the execution of the user program process in response to reading a prescribed interruption mask cancel command.

5. A programmable controller according to claim 1, wherein the prescribed interval is determined by the sum of the time duration of executing the previous peripheral service process and a prescribed time period.

6. A programmable controller comprising:
   an I/O unit for input and output with various pieces of equipment that are to be controlled;
   an I/O memory for storing I/O data corresponding to the I/O unit;
   a user program memory for storing user program corresponding to user defined control requirements;
   a system program memory for storing various system programs in order to realize functions as a PLC (lower level programmable controller);
   a microprocessor for executing a system program stored in the system program memory;
   an interruption trigger generating means for generating an interruption trigger at a prescribed constant interval; and
   a mode setting means for setting an operation mode to one of a first mode and a second mode;
   the system program comprising:
      a user program execution process for executing user programs stored in the user program memory;
      an I/O refresh process for refreshing I/O data between the I/O memory and the I/O unit; and
      a peripheral service process comprising data communication with an upper-level computer, communication with special I/O or remote I/O, and data relay process in a FA (factory automation) network, wherein;
         in the first mode, the user program process, I/O refresh process, and peripheral service process are cyclically executed by the microprocessor according to a normal procedure; and
         in the second mode, the user program process and I/O refresh process are executed by the microprocessor according to the normal procedure for a first prescribed constant amount of time, and the peripheral service process is cyclically executed at prescribed constant intervals for a second prescribed constant amount of time according to an interruption process of the microprocessor every time an interruption trigger is generated by interruption trigger generating means, and wherein the first prescribed amount of time and the second prescribed amount of time are unequal in duration.

* * * * *